March 10, 1942.   W. B. BOHANNON   2,276,013
APPARATUS FOR ELECTRICAL TRANSFORMATION
Filed June 8, 1939
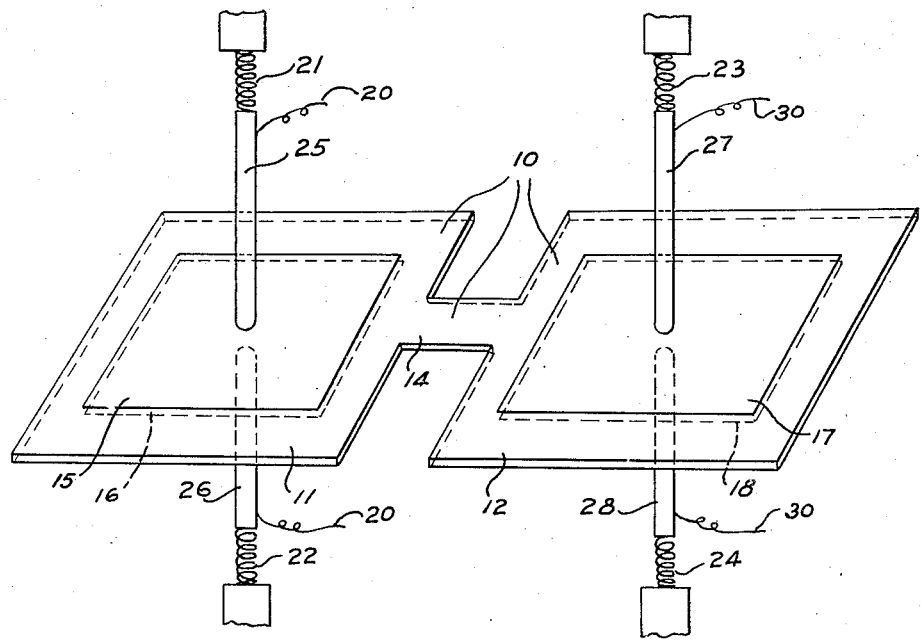
INVENTOR
W. B. BOHANNON
BY
E. R. Nowlan
ATTORNEY Patented Mar. 10, 1942

2,276,013

UNITED STATES PATENT OFFICE 2,276,013

APPARATUS FOR ELECTRICAL TRANSFORMATION

William B. Bohannon, Westfield, N. J., assignor to Western Electric Company, Incorporated, New York, N. Y., a corporation of New York Application June 8, 1939, Serial No. 278,087

7 Claims. (Cl. 178—44)

This invention relates to apparatus for electrical transformation, and more particularly to apparatus for electrical transformation and adapted to act as a coupling means for two electrical alternating current circuits wherein the coupling function is mechanically effected, and wherein a predeterminedly limited band of frequencies only is carried over from one circuit to the other.

There are innumerable instances in the electrical arts and especially in those dealing with interrelated phenomena of sound and electricity as in the communications arts, where it is desirable to couple two electrical circuits together in such fashion that alternating potentials created in one circuit will be effective to produce corresponding or related potentials in the other circuit. There are many electrically acting methods and devices for accomplishing this result generally. However, when it is desired to limit this coupling function so that only a predeterminedly and often narrowly limited band of frequencies shall pass over the coupling, difficulties often arise from the fact that one particular frequency within the band is transmitted with maximum effect and all others much less effectively, so that the curve of efficiency of transmission within the band will show a marked maximum with often a sharp falling away on both sides.

An object of the present invention is to provide a simple, reliable and effective apparatus therefor for reproducing, over a predeterminedly limited band of frequencies, in a secondary circuit, electrical frequencies present in a primary circuit, with a substantially constant degree of efficiency over the entire band.

In one embodiment in an apparatus, the invention may present a pair of bodies of dielectric material connected together by an integral bridge, the fundamental period of mechanical vibration of one of the bodies being a harmonic of that of the other and the dimensions of the bridge being such that vibrations of the one body will be transmitted through the bridge to the other body over a predeterminedly limited band of frequencies only, in combination with electrical means to produce mechanical vibrations in the one body and electrical means to convert mechanical vibrations of the second body into electrical pulses of corresponding frequency.

Other objects and features of the invention will appear from the following detailed description of one embodiment thereof taken in connection with the accompanying drawing wherein the single figure is a diagrammatic illustration of a device constructed in accordance with the invention.

In the embodiment of the invention herein disclosed a slice or slab 10 of crystalline quartz or other suitable solid dielectric material is cut to present two condenser plates 11 and 12 united by an integral bridge 14. Condenser coatings 15 and 16 of metal are formed or secured on opposite faces of the plate 11 and plate 12 is provided with similar coatings 17 and 18.

A pair of electrical contact members 25 and 26, of metal, which also serve as mechanical supports for the slab 10 and its coatings, are pressed against the coatings 15 and 16 of the plate 11 by springs 21 and 22, respectively, and may be electrically connected through leads 20 in a circuit as desired. The contact ends of the members 25 and 26 are preferably rounded as shown or pointed so that each makes substantially one point contact only with the corresponding coating and through this with the plate 11. Furthermore, these two points of contact are selected to be directly in line with each other on opposite sides of the plate and at a point of the plate which is a node of the natural system of mechanical vibration of the plate. The plate 12 is similarly supported mechanically at a node between the electrical contacts 27 and 28 and springs 23 and 24, the contacts being provided with leads 30 for electrical connection.

If now an alternating electrical potential be applied through the leads 20 to the plate 11 between the coatings 15 and 16, whose frequency is the same as the natural free vibration frequency of the plate 11 or is a harmonic of that frequency, the plate 11 will vibrate mechanically in corresponding fashion. If then the dimensions of the bridge 14 have been suitably selected a certain definite band of the vibration of the plate 11 will be transmitted through the bridge 14 and will generate corresponding vibrations in the plate 12, which in turn will generate an electrical potential of corresponding frequency in the coatings 17 and 18 and hence in the leads 30.

Assume now that the plates 11 and 12 are of the same frequency of fundamental natural mechanical vibration. Then if the bridge 14 be sufficiently strong and rigid, it will transmit vibrations from the driving plate 11 to the driven plate 12. As the bridge is diminished in cross-section, or increased in length from plate to plate, or both, its ability to transmit vibration is diminished, both as to range of frequency and amplitude of vibration transmitted. There is a certain critical state of the bridge at which it will just transmit the pure fundamental of the vibration of the driver plate to the driven plate, and below which it transmits nothing. A bridge having this critical state will be called a critical mechanical coupling of the two plates.

If the bridge be shortened or widened or thickened, or any two or all three at once of these, it takes on the power of transmitting not only the pure fundamental vibration and its harmonics, but also, and this in increasing measure, the power of transmitting vibrations a little above and a little below the fundamental in frequency together with the harmonics of these, so that the stiffer the bridge the wider the band of frequencies which it will transmit.

Thus in the case now being considered, where the plates 11 and 12 are alike in fundamental frequency of mechanical vibration, if this frequency be denoted by $f_0$ and if $k$ be a quantity derivable from the length of the bridge, its width and thickness the band of frequencies transmitted by the bridge will lie between two limiting frequency values $f_1$ and $f_2$, probably defined by equations of the following forms:

(1) $$f_1 = \frac{f_0}{\sqrt{1+k}}$$

(2) $$f_2 = \frac{f_0}{\sqrt{1-k}}$$

(3) $$k = \frac{c t^2 w^2}{l^2}$$

where $l$ is the length, $t$ the thickness and $w$ the width of the bridge, and $c$ is a constant dependent upon the material of the body 10 and probably representing its density and its stiffness among other possible factors.

Furthermore, the ability of the bridge to transmit vibrations between the frequency limits $f_1$ and $f_2$ is roughly substantially constant and diminishes abruptly above the upper and below the lower limit, so that the curve of efficiency of transmission has no sharp maximum but shows a substantially flat top nearly from $f_1$ to $f_2$.

Thus in effect the apparatus will receive alternating electric potential at the coatings 15 and 16, convert them in the plate 11 into mechanical vibration of a corresponding frequency, transmit a sharply defined band of frequency of such vibration to the plate 12, and convert these into alternating electric potential of corresponding frequency in the coatings 17 and 18; and the width of the band can be predetermined by the proper dimensioning of the bridge.

Analogous phenomena occur when two resonant electrical circuits are electrically coupled in various ways. But it is found difficult if not impossible, generally speaking, to limit the bands transmitted by such impedance or capacitance or inductance couplings or the like to widths less than are expressible in kilocycles unless by adjunction to the couplings of more or less complex systems of filters and the like. The method and apparatus of the invention, however, render it possible without further adjuncts to confine the coupling, if desired, to bands whose width is measured by cycles instead of kilocycles. Nevertheless, by reducing the notches in the body 10 which delimit the bridge 14, the width of the band transmitted can be increased to practically any extent; and when the notches disappear, any vibration impressed on the plate 11 will be transmitted to the plate 12.

It will be evident that the plates 11 and 12 need not be substantially alike in dimensions as shown. For the method and the apparatus to be operative, it is only necessary that some one or more of the natural modes of vibration, whether fundamental or harmonic, of the one plate be of the same frequency as modes of vibration in the other, and that the dimensions of the bridge be suitably chosen. Thus if the fundamental of the driven plate be of the same frequency as one of the harmonics of the driver plate, an electrical potential impressed on the coatings of the driver plate which has the frequency of the fundamental of the driver will reappear in the coatings of the driven plate stepped up to the frequency of the corresponding harmonic of the driver.

Thus electrical potential of given frequency is convertible by the present invention not only into electrical potential (in another place) of the same frequency, but also, if desired, of a frequency which is a harmonic of the first frequency or which is fundamental to the first frequency considered as harmonic. In the appended claims, therefore, where one frequency is spoken of as "corresponding" to another frequency, the word "corresponding" is to be taken in the artificial sense of meaning that the two frequencies are alike or that one is a harmonic of the other.

The embodiment disclosed is illustrative only and may be variously modified and departed from without departing from the spirit and scope of the invention as pointed out in and limited solely by the appended claims.

What is claimed is:

1. An apparatus for electrical transformation which comprises a condenser having a dielectric member and two metallic members on the dielectric member and insulated from each other thereby, a second condenser having a dielectric member and two metallic members on the dielectric member and insulated from each other thereby, and a rigid member of smaller cross section than either dielectric member and rigidly connected to and between the two said dielectric members to transmit mechanical vibrations of a limited range of frequency only of the one dielectric member to the other.

2. An apparatus for electrical transformation which comprises a generally H-shaped dielectric member consisting of two relatively wide bodies interconnected by an integral relatively narrow bridge and two metallic members on each body and insulated from each other thereby.

3. An apparatus for electrical transformation which comprises a slab of dielectric material having two substantially colinear slots extending toward each other from opposite edges of the slab and separated by a bridge of the slab to form two relatively wide flat plates joined by the narrower integral bridge and two metallic members on each body and insulated from each other thereby.

4. An apparatus for electrical transformation which comprises two dielectric condenser plates joined together and spaced apart by a bridge integral therewith and metallic coatings on each side of each plate, the plates being dimensioned to have the fundamental mode of mechanical vibration of the one plate the same in frequency as that of one of the harmonics of the fundamental mode of mechanical vibration of the other plate, and the bridge being dimensioned to transmit mechanical vibration of said frequency only from the one plate to the other.

5. An apparatus for electrical transformation which comprises two dielectric condenser plates joined together and spaced apart by a bridge integral therewith, metallic coatings on each side of each plate, and a mechanical support member for each side of each plate abutted thereagainst at a point which is a node in the mechanical vibration thereof, the plates being dimensioned to have a natural mode of mechanical vibration of the one plate corresponding in frequency to a natural mode of mechanical vibration of the other plate.

6. An apparatus for electrical transformation which comprises two dielectric condenser plates joined together and spaced apart by a bridge integral therewith, metallic coatings on each side of each plate, and a combined electrical contact and mechanical support member for each side of each plate abutted against the coating thereon at a point which is a node in the mechanical vibration thereof, the plates being dimensioned to have a natural mode of mechanical vibration of the one plate corresponding in frequency to a natural mode of mechanical vibration of the other plate.

7. An apparatus for electrical transformation which comprises two dielectric condenser plates joined together and spaced apart by a bridge integral therewith, metallic coatings on each side of each plate, and a combined electrical contact and mechanical support member for each side of each plate abutted against the coating thereon at a point which is a node in the mechanical vibration thereof, the plates being dimensioned to have a natural mode of mechanical vibration of the one plate corresponding in frequency to a natural mode of mechanical vibration of the other plate and the bridge being dimensioned to pass only a narrow band of frequency of mechanical vibration from the one plate to the other plate.

WILLIAM B. BOHANNON.